US006613427B1

(12) United States Patent
Morrison et al.

(10) Patent No.: US 6,613,427 B1
(45) Date of Patent: Sep. 2, 2003

(54) METHOD FOR APPLYING HIGH EMISSIVITY COATING

(75) Inventors: Edward F. Morrison, Burnt Hills, NY (US); Larry P. Rice, Rensselaer, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/969,850

(22) Filed: Oct. 4, 2001

(51) Int. Cl.$^7$ ............................ B05D 1/36; B05D 5/12; B05D 1/02; B05D 3/02
(52) U.S. Cl. ......................... 428/323; 428/543; 427/8; 427/58; 427/180; 427/203; 427/402; 427/421; 427/372.2
(58) Field of Search ......................... 427/8, 402, 421, 427/180, 203, 372.2, 58; 428/543, 323

(56) References Cited

U.S. PATENT DOCUMENTS

| | | | | |
|---|---|---|---|---|
| 3,854,994 A | * | 12/1974 | Binder et al. ............... | 427/115 |
| 4,042,723 A | * | 8/1977 | Presby ........................ | 356/496 |
| 4,682,075 A | * | 7/1987 | Nelson et al. ............... | 252/502 |
| 5,308,661 A | * | 5/1994 | Feng et al. .................. | 423/446 |
| 5,518,061 A | * | 5/1996 | Newkirk et al. .............. | 164/97 |

* cited by examiner

Primary Examiner—Michael Barr
(74) Attorney, Agent, or Firm—Julia Cook Moody; Paul A. Gottlieb

(57) ABSTRACT

The present invention is a method for applying a high emissivity graphite powder coating to a variety of various substrates. The method employs a mixture consisting substantially of 75 % of a solution of colloidal carbon in isopropanol and 25 % of butyl alcohol as a bonding agent. First, a first layer of the mixture is applied to a surface of the substrate. After the surface of the substrate dries, a second layer of the mixture is applied to the surface of the substrate. Then a layer of a graphite powder is applied to the substrate over the second layer of the mixture while it is still wet. The method provides the surface of the substrate with high emissivity ($\epsilon > 0.9$) and low reflectance characteristics that may be exposed to high temperatures.

9 Claims, No Drawings

METHOD FOR APPLYING HIGH EMISSIVITY COATING

The present invention was conceived and developed under a U.S. Government Contract awarded by the U.S. Department of Energy. The Government has rights in this invention.

BACKGROUND OF THE INVENTION

1. Field of the Invention

The present invention relates generally to methods for coating various substrates. More particularly, the present invention discloses a method for coating a substrate with a graphite powder to produce an article exhibiting low reflectance high emissivity at temperatures 1800° F. or more.

2. Description of the Prior Art

Significant efforts have been directed to modifying the properties of known or existing materials in a manner that renders the materials suitable for use in particular applications. For example, it is desirable that various substrates in thermophotovoltaic power systems have surfaces with a stable high emissivity ($\epsilon > 0.9$) and low reflectance that may be exposed to temperature in excess of 1800° F. As is well known to those skilled in the art, emissivity is the ratio of the radiant energy emitted by a surface to that emitted by a blackbody at the same temperature. Reflectance is the fraction of the total radiant flux incident upon a surface that is reflected and that varies according to the wavelength distribution of the incident radiation (Merriam-Webster's Collegiate® Dictionary). The substrates may be made of a number of different materials such as boron nitride, silicon carbide, and various high temperature metal alloys. Typical emissivity values ($\epsilon$) of the uncoated surfaces of these materials measured at 1.55 microns using a Pyrolaser® pyrometer, are in the range of 0.40 to 0.75.

In particular, a boron nitride substrate with the desired emissivity $\epsilon > 0.9$ is not currently commercially available. However, in view of the recent developments in the thermophotovoltaic power systems technology, there is a need for the stable high emissivity and low reflectance coating on the boron nitride substrate that can handle high temperature (around 1800° F.) and remain intact.

Attempts to adhere a variety of different powders in various paste type mixtures, using various liquids and other physical forms, to the surface of the boron nitride substrate using paintbrush type techniques, resulted in obtaining surfaces with high enough emissivity (in the range from 0.8 to 0.9), but poor adhesion and uniformity. There were attempts to apply other materials, such as milk and peanut oil, to the boron nitride substrate using brush or spray techniques and expose them to high temperature (in excess of 2000° F.). These substances produced dark colorations consistent with high emissivity, but the coating was not uniform.

Also, commercially available high temperature paints and other high temperature coating materials including Neolube (a solution of colloidal carbon in isopropanol from Huron Industries, Fort Huron, Mich.) were applied using brush or spray techniques to the surface of the boron nitride substrate. The resulting coating provided high emissivity (in the range from 0.8 to 0.9), but the surface of the substrate lacked proper adhesion and uniformity either before or, in some cases, after exposure to high temperature (>1800° F.). The exception was the Neolube coating material that adhered well, but had low emissivity (approximately 0.7), which is not sufficient for the intended application.

Furthermore, carbon, graphite powder and other dark powders were mixed with the liquid coatings in order to further increase the emissivity of the surface of the substrate, and applied (using brush or spray techniques) as a coating to the boron nitride substrate. As a result, some surfaces with the emissivity in excess of 0.9 were obtained, but lacked proper adhesion and uniformity.

Therefore, there is the need for a method for applying a coating to a boron nitride substrate that provides stable high emissivity and low reflectance and can be exposed to high temperatures (around 1800° F.).

SUMMARY OF THE INVENTION

An object of the present invention is to provide a graphite powder coating to various substrates, such as boron nitride, silicon carbide and various high temperature metal alloys, having high emissivity ($\epsilon > 0.9$) and low reflectance that may be exposed to high temperatures (around 1800° F.).

The present invention discloses a novel method for applying a graphite powder coating to a substrate in order to provide a surface with high emissivity ($\epsilon > 0.9$) and low reflectance characteristics that may be exposed to high temperatures (around 1800° F.). The present invention is particularly applicable to a substrate made of materials such as boron nitride, silicon carbide and various high temperature metal alloys. The present invention exhibits the advantages of having excellent bonding coupled with a desirable surface grain finish that can withstand high temperature requirements while maintaining good adhesion with a minimal amount of outgassing.

According to the present invention, a mixture consisting substantially of 75% by weight of a solution of colloidal carbon in isopropanol (preferably, Neolube from Huron Industries or the like) and 25% by weight of butyl alcohol is provided. First, a first layer of the mixture is applied to the surface of the substrate that has been cleaned and is void of oil and undesirable contaminants. After the mixture applied to the surface of the substrate dries, a second layer of the mixture is applied to the surface of the substrate that has been cleaned and is void of oil and undesirable contaminants. Then, a layer of the graphite powder is applied to the substrate over the second layer of the mixture while it is still wet.

Further, according to the present invention, an additional layer of the graphite powder may be applied over the previously coated surface or over any portion of the surface not coated in the first application in a manner disclosed above.

Therefore, the method for applying a graphite powder coating to a substrate in accordance with the present invention provides the substrate with a surface having high emissivity ($\epsilon > 0.9$) and low reflectance characteristics that may be exposed to high temperatures (around 1800° F.).

DETAILED DESCRIPTION OF PREFERRED EMBODIMENTS

The present invention is a method for applying a high emissivity coating to a substrate. The substrate may be made of a number of different materials such as boron nitride, silicon carbide, various high temperature metal alloys, such as Alloy 690 and Alloy 718. According to the preferred embodiment of the present invention, the substrate is made of boron nitride.

In the preferred embodiment of the present invention, the high emissivity of a surface of the boron nitride substrate is achieved by coating thereon a layer of a purified graphite powder. By way of non-limiting example, the presently preferred graphite powder is grade AXF-5Q graphite from POCO Graphite, Inc., Decatur, Tex. The POCO™ graphite powder has a size range of 1 to 300 microns with a mean size of 4 microns.

In order to reliably adhere the graphite powder to the surface of the substrate, a mixture consisting substantially of approximately 75% by weight of a solution of colloidal carbon in isopropanol ($C_3H_8O$) and approximately 25% by weight of butyl alcohol is employed. The butyl alcohol provides an additional drying time for the mixture for enabling bonding of the graphite powder in a more controllable sequence. By way of non-limiting example, a presently preferred solution of colloidal carbon in isopropanol is Neolube from Huron Industries, Fort Huron, MI. It consists of 10.71% graphite solids in certified pure isopropanol as a vehicle.

In the exemplary embodiment, initially, a first layer of the mixture of the 75% by weight of Neolube and 25% of the butyl alcohol is applied to the surface of the boron nitride substrate. The first layer of the mixture may be applied to the substrate by means of an airbrush type sprayer, or any other appropriate means well known to those skilled in the art. The airbrush sprayer employed is of a well-known form and does not require detailed description.

After the surface of the substrate has dried, a second layer of the mixture is applied to the substrate. Again, the second layer is applied preferably by means of the airbrush type sprayer.

Then, a layer of the POCO™ graphite powder is immediately applied to the substrate over the second layer of the mixture before it has dried out.

Further, according to the present invention, additional layers of the graphite powder may be applied over the previously coated substrate or over any portion of the substrate not coated in the first application so that the resulting coating is as uniform as possible. By way of non-limiting example, if an area to be coated is missed completely or inadequately coated, such areas may be coated with Neolube following the same procedure outlined above, followed by graphite powder. Such areas may be coated and re-coated repeatedly until the coated substrate has an acceptably uniform surface.

The disclosed method demonstrates an improvement over the prior art and provides the boron nitride substrate with a coating displaying the desired high emissivity ($\epsilon > 0.9$) and low reflectance characteristics that may be exposed to high temperatures (1800° F. or more). Furthermore, the method of the present invention provides an ability to apply a homogenous layer of the graphite powder onto the surface of the substrate yielding excellent bonding characteristics. The resulting coating withstands a direct air blast of approximately 30 psi from a distance of 12 inches.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for applying a high emissivity coating to a thermophotovoltaic system substrate, said method comprising the steps of:
    (a) providing a mixture of colloidal carbon in isopropanol mixed with butyl alcohol;
    (b) applying a first layer of the mixture to the substrate;
    (c) drying the first layer;
    (d) applying a second layer of the mixture to the substrate over the first layer of the mixture; and
    (e) applying a first layer of a graphite powder over the second layer of the mixture before the second layer of the mixture has dried.

2. The method for applying the high emissivity coating to the substrate as defined in claim 1, wherein said mixture of colloidal carbon and alcohol comprises a mixture of about 75% by weight of a solution of colloidal carbon in isopropanol and about 25% by weight of butyl alcohol.

3. The method for applying the high emissivity coating to the substrate as defined in claim 1, selecting the substrate from the group consisting of boron nitride, and silicon carbide.

4. The method for applying the high emissivity coating to the substrate as defined in claim 1, wherein said substrate is coated with graphite powder having a size range of about 1 to about 300 microns.

5. The method for applying the high emissivity coating to the substrate as defined in claim 4, wherein said graphite powder has a mean size of about 4 microns.

6. The method for applying the high emissivity coating to the substrate as defined in claim 1, further comprising the steps of:
    (f) examining the coating to detect missed or inadequately coated areas;
    (g) repeating the steps (a) through (e) in claim 1 until the coated substrate has a surface that appears uniform to the naked eye.

7. The method for applying the high emissivity coating to the substrate as defined in claim 1, wherein the layers of the mixture and the layer of the graphite powder are applied to the substrate by means of an airbrush sprayer.

8. A method for applying a high emissivity coating to a thermophotovoltaic system substrate, said method comprising the steps of:
    (a) providing a mixture consisting substantially of approximately 75% of a solution of colloidal carbon in isopropanol and approximately 25% of butyl alcohol;
    (b) applying a first layer of the mixture to the substrate;
    (c) drying the first layer;
    (d) applying a second layer of the mixture to the substrate over the first layer of the mixture;
    (e) providing a graphite powder having a size range of 1 to about 300 microns and a mean size of about 4 microns;
    (f) applying a layer of the graphite powder over the second layer of the mixture before the second layer of the mixture has dried;
    (g) examining the coating to detect missed or inadequately coated areas;
    (h) repeating the steps (a) through (f) until the coated substrate has a surface that appears uniform to the naked eye.

9. A substrate having a high emissivity coating applied thereon in accordance with the method of claim 1.

* * * * *